United States Patent [19]

Danielson et al.

[11] Patent Number: 5,663,993
[45] Date of Patent: Sep. 2, 1997

[54] WATER ROD FLOW METERING WITHIN THE WATER ROD LOWER END PLUG

[75] Inventors: David W. Danielson, Aptos, Calif.; Robert B. Elkins; Thomas G. Dunlap, both of Wilmington, N.C.

[73] Assignee: General Electric Company, Schenectady, N.Y.

[21] Appl. No.: 542,345

[22] Filed: Oct. 12, 1995

[51] Int. Cl.⁶ ............................................. G21C 3/32
[52] U.S. Cl. .................... 376/444; 376/352; 376/313
[58] Field of Search ............................. 376/352, 353, 376/444, 313, 446

[56] References Cited

U.S. PATENT DOCUMENTS

| | | | |
|---|---|---|---|
| 3,225,749 | 12/1965 | Froot | 376/313 |
| 3,392,087 | 7/1968 | Braun et al. | 376/352 |
| 3,574,058 | 4/1971 | Gumachian . | |
| 3,725,199 | 4/1973 | Notari et al. | 376/352 |
| 3,802,995 | 4/1974 | Fritz et al. . | |
| 3,861,999 | 1/1975 | Zmola et al. | 376/353 |
| 3,954,560 | 5/1976 | Delafosse et al. | 376/353 |
| 4,418,036 | 11/1983 | Gjertsen et al. . | |
| 4,675,154 | 6/1987 | Nelson et al. . | |
| 4,738,820 | 4/1988 | Wilson et al. | 376/446 |
| 4,828,791 | 5/1989 | DeMario | 376/352 |
| 4,900,507 | 2/1990 | Shallenberger et al. | 376/352 |
| 5,071,617 | 12/1991 | Bryan et al. | 376/352 |
| 5,180,550 | 1/1993 | Nyland | 376/353 |
| 5,232,655 | 8/1993 | Verdier | 376/353 |
| 5,297,177 | 3/1994 | Inagaki et al. . | |
| 5,327,471 | 7/1994 | Meier et al. . | |
| 5,347,560 | 9/1994 | Lippert et al. . | |

FOREIGN PATENT DOCUMENTS

| | | | |
|---|---|---|---|
| 0 099 323 | 1/1984 | European Pat. Off. . | |
| 4122209 | 1/1992 | Germany | 376/444 |
| 0220686 | 12/1984 | Japan | 376/444 |
| 6439593 | 5/1987 | Japan | 376/444 |
| 2044290 | 2/1990 | Japan | 376/444 |

*Primary Examiner*—Harvey E. Behrend
*Attorney, Agent, or Firm*—Nixon & Vanderhye P.C.

[57] ABSTRACT

In a nuclear fuel rod assembly including a plurality of fuel rods and at least one water rod held together in a bundle, and wherein end plugs at the lower ends of the fuel rods and the at least one water rod engage a lower tie plate, an improvement wherein the end plug at the lower end of the at least one water rod is hollow and includes a multi-diameter flow metering bore for regulating coolant flow into the water rod.

5 Claims, 2 Drawing Sheets

5,663,993

WATER ROD FLOW METERING WITHIN THE WATER ROD LOWER END PLUG

TECHNICAL FIELD

This invention relates generally to fuel bundle assemblies for boiling water nuclear reactors, and specifically to water rod configurations within such assemblies.

BACKGROUND

Conventional boiling water reactor fuel bundle assemblies utilize one or more water rods extending upwardly through the bundle to provide a source of coolant/moderator to maintain a more uniform distribution of power throughout the bundle. For convenience, reference will be made to water rods in the plural, recognizing that a single water rod bundle is also well known in the art. Typically, the water rods are closed at both ends by end plugs received in upper and lower tie plates of the bundle assembly. Side entry and exit holes are formed in the lower and upper portions, respectively, of each rod to allow a portion of the liquid coolant flowing upwardly through the bundle to pass through the rods. In some cases, the water rods transition at both ends to a larger diameter center section which extends for most of the axial lengths of the rods. It has been attempted to combine side entry holes and a metering device within the lower diameter transition, but this arrangement has not always permitted the accurate regulation of coolant within the water rod, and because of the location of the metering device, is relatively expensive to manufacture.

In all cases, it is desirable to accurately meter the flow through the water rods to the amount required to prevent boiling within the rods. If there is too little flow, the coolant will boil within the rods, thus negating the purpose of the rods which is to distribute non-boiling water throughout the bundle length. Too much flow, on the other hand, starves the region around the fuel rods, outside the water rods.

DISCLOSURE OF THE INVENTION

We now have determined that incorporation of a coolant flow metering device within the water rod end plugs is not only a more cost effective solution to the problem than using entry and exit holes and a separate metering device within the tube, but also a more accurate method in terms of coolant flow regulation.

In the exemplary embodiment, a lower end plug construction for water rods is provided which includes a relatively large entry bore, a reduced diameter center bore and an enlarged diameter exit bore. The end plugs are preferably welded to the lower ends of the water rods about annular shoulders formed on the end plugs. The plugs are also provided with external screw threads so that the water rods can be threadably secured to the lower tie plate, but other fastening means may be employed.

Accordingly, in its broadest aspects, the present invention relates to a nuclear fuel rod assembly comprising a plurality of fuel rods and at least one water rod held together in a bundle, and wherein end plugs at the lower ends of the fuel rods and the at least one water rod engage a lower tie plate, the improvement wherein the end plug at the lower end of the water rod is hollow and includes a multi-diameter flow metering bore for regulating coolant flow into the water rod.

Additional objects and advantages of the invention will become apparent from the detailed description which follows.

BEST MODE FOR CARRYING OUT THE INVENTION

Figure 1:
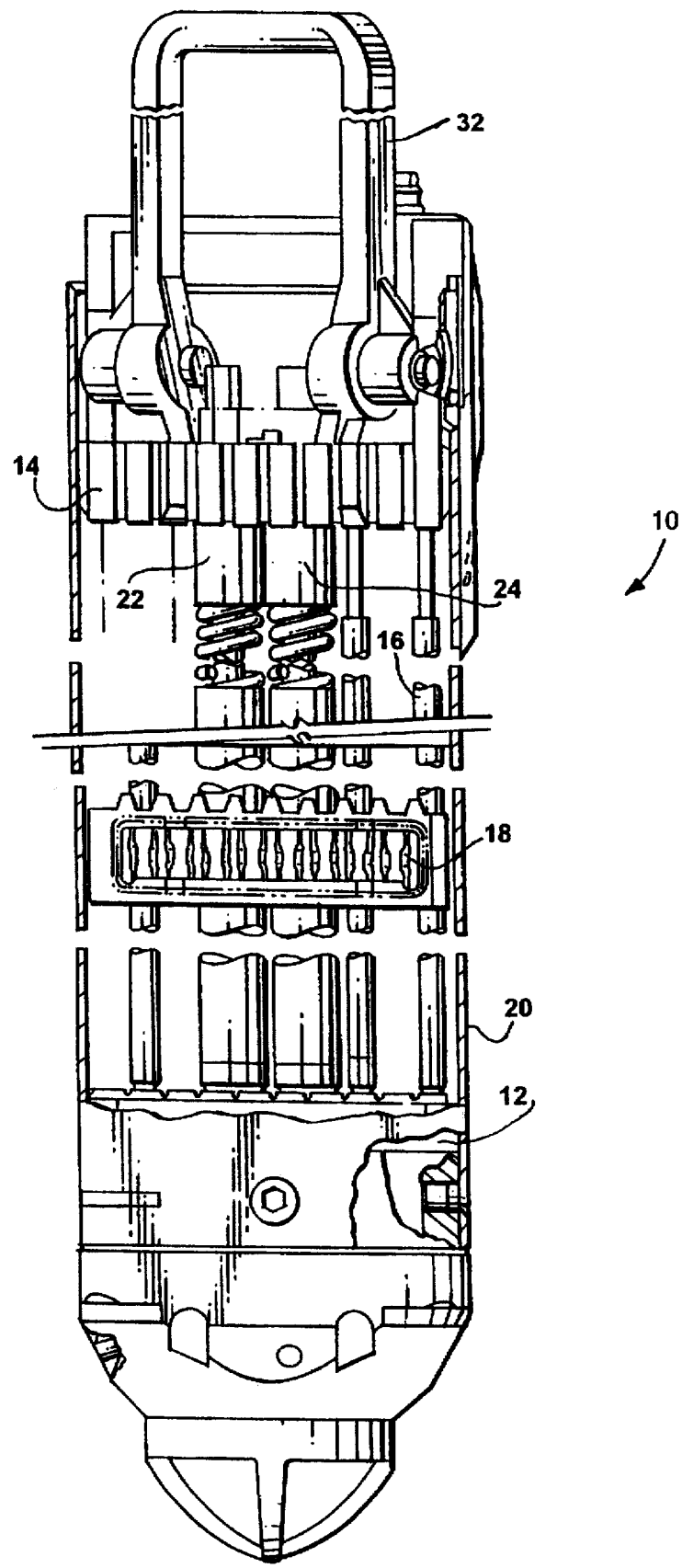
FIG. 1 is an axially shortened side elevation, partly in section, illustrating a nuclear reactor fuel bundle assembly incorporating the present invention.

Referring now to the drawings, particularly FIG. 1, there is illustrated a nuclear fuel bundle assembly generally designated 10, incorporating the feature of the present invention. Briefly, the nuclear fuel bundle assembly 10 includes a lower tie plate 12, an upper tie plate 14, a plurality of fuel rods 16 extending between the lower tie plate 12 and upper tie plate 14. A plurality of spacers 18 (one shown) are disposed at vertically spaced locations along the height of the fuel bundle for maintaining the fuel rods and water rods in predetermined lateral positions relative to one another. The fuel bundle assembly 10 is encased within a casing or channel 20.

In conventional fashion, coolant/moderator liquid flows into an opening through the lower tie plate 12 and into and about the fuel rods 16 within the channel 20 and upwardly through the spacers 18, whereby steam is generated for use in, for example, the production of electricity. In this fuel bundle assembly, a pair of water rods 22, 24 structurally interconnect the upper and lower tie plates 14, 12, and no other structural connections between the upper and lower tie plates are employed. While only a pair of water rods are disclosed and discussed herein, it will be appreciated that one or more additional water rods may be employed to structurally interconnect the upper and lower tie plates to one another. Alternatively, a single water rod may be employed for the same purpose. It will be appreciated however, that the invention disclosed herein is equally applicable to other fuel bundle assemblies where, for example, fuel rods configured as tie rods serve as the load bearing members of the bundle.

The water rods or tubes 22 and 24 extend vertically through central regions of the fuel bundle, although other locations may be appropriate. The water rods in the exemplary embodiment are threadedly attached at their lower ends to the lower tie plate 12 (FIG. 2) and extend upwardly within the fuel bundle through the spacers 18 for coupling to the upper tie plate 14 in the manner described in commonly owned copending application Ser. No. 08/380,587 filed Jun. 30, 1995, and now allowed. That application is incorporated herein by reference.

Figure 2:
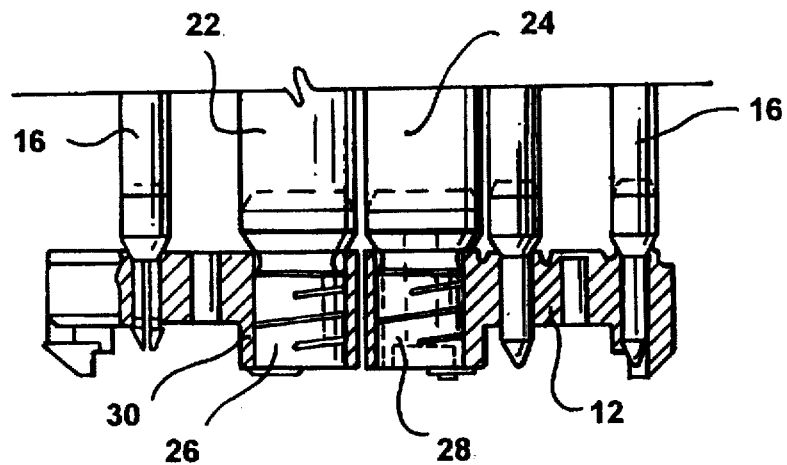
FIG. 2 is an enlarged detail, partly in section, illustrating the engagement between two centrally located water rods within the fuel bundle assembly and a lower tie plate and incorporating end plugs in accordance with this invention.
Figure 3:
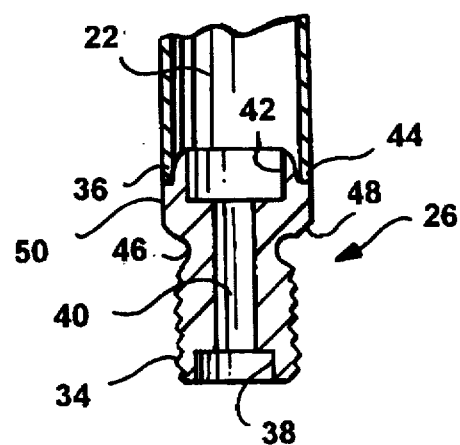
FIG. 3 is a detail taken from FIG. 2, illustrating in section a water rod end plug in accordance with the invention.

The invention here has to do with the lower end plugs 26, 28, respectively, of the water rods 22, 24 by which the latter are secured to the lower tie plate 12. With reference specifically to FIGS. 2 and 3, the end plug 26 (end plug 28 is identical, and both are made of Zircaloy), it may be seen from FIG. 3 that the end plug is secured to the lower end of the water rod 24, by welding for example, and is in threaded engagement within a cylindrical boss 30 provided in the lower tie plate. With the water rods so attached to the lower tie plate, and attached to the upper tie plate in the manner described in the '587 application, it may be appreciated that the water rods serve as the sole load bearing means within the fuel bundle assembly 10. In other words, the entire fuel bundle assembly may be lifted out of the reactor core via the handle 32 which is structurally connected to the water rods by means of the latch mechanism disclosed in the '587 application. For other structural arrangements, however, the water rod end plug may be received in the lower tie plate in various other ways, and this invention is not limited to any particular fastening technique.

As already noted above, in this invention, the water rods 22, 24 and specifically the water rod end plugs 26 and/or 28 incorporate a flow restriction or metering mechanism best seen in FIG. 3. The end plug 26 includes a coolant entrance end at 34 and a coolant exit end at 36. At the coolant entrance end 34, an enlarged inlet counterbore 38 opens to the upstream coolant flow. This opening is reduced to a smaller diameter center bore 40 which extends through the plug to an exit where it opens to another larger counterbore 42.

The center bore 40 has a greater axial length than either the inlet or outlet counterbores.

The exterior of the metering device is formed with an annular locating shoulder 44 on which seats the lower end of the water rod, where the two are welded together by conventional welding techniques. The threaded cylindrical exterior portion of the end plug terminates at a slightly reduced neck portion 46 Which merges with a tapered transition 48, which in turn merges with a cylindrical portion 50 terminating at the shoulder 44.

In the exemplary embodiment, the reduced diameter center bore 46 may have a diameter of about 0.297 inches, but it will be appreciated that the center bore 40 may be altered in accordance with the desired regulation of flow through the water rod.

Figure 4:
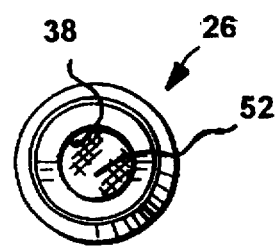
FIG. 4 is a bottom plan of the end plug shown in FIG. 3, but with a debris screen incorporated therein.

In an alternative arrangement, because the water rod inlet may in fact bypass a debris filter arrangement in the vicinity of the lower tie plate, a debris screen 52 (FIG. 4) may be incorporated into the metering device inlet counterbore 38, with flow openings sized and arranged to provide the desired pressure drop and flow characteristics.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a nuclear fuel rod assembly comprising a plurality of fuel rods and at least one water rod held together in a bundle, and wherein end plugs at the lower ends of said fuel rods and said at least one water rod engage a lower tie plate, the improvement wherein the end plug at the lower end of said at least one water rod is hollow and includes a multi-diameter flow metering bore for regulating coolant flow into the water rod, said flow metering bore having entry and exit portions having relatively larger diameters and an intermediate portion having a relatively smaller diameter and extending axially between said entry and exit portions, said intermediate portion having a greater axial length than each of said entry portion and said exit portion.

2. The assembly of claim 1 wherein said end plug is welded to the water rod.

3. The assembly of claim 1 wherein said end plug is formed with exterior threads for threaded engagement with the lower tie plate, and further wherein said at least one water rod is a structural load bearing member in the fuel rod assembly.

4. The water rod of claim 1 wherein said end plug includes a debris screen at an inlet end thereof.

5. The water rod of claim 1 wherein said end plug is Zircaloy.

* * * * *